UNITED STATES PATENT OFFICE 1,997,980

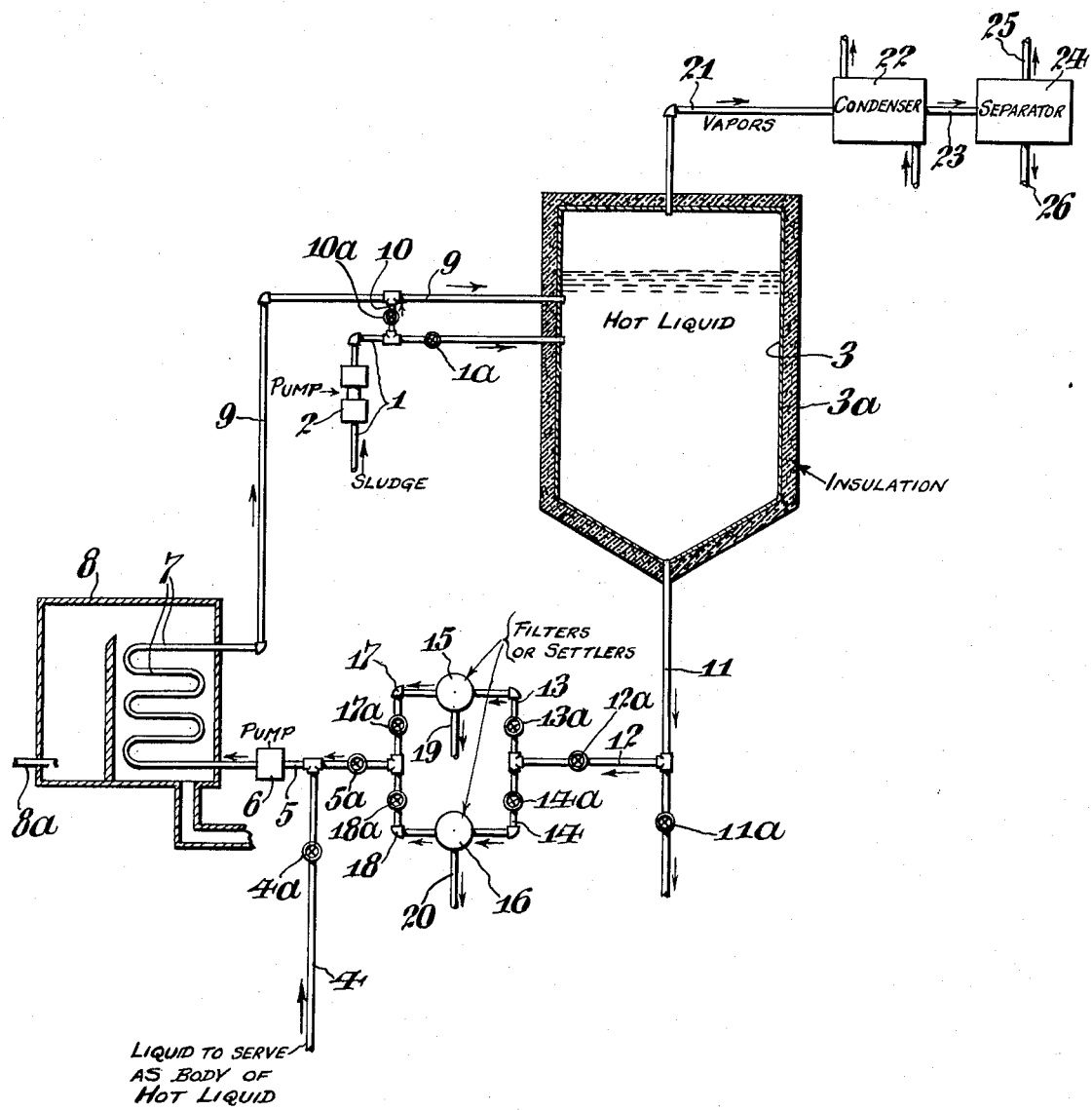

SLUDGE TREATMENT

Lloyd B. Smith, Moorestown, N. J., assignor to The Atlantic Refining Company, Philadelphia, Pa., a corporation of Pennsylvania Application September 5, 1931, Serial No. 561,352

9 Claims. (Cl. 23—177)

The present invention relates to the treatment of sludges which result from acid treating petroleum or fractions thereof, or the like.

In the past it has been customary to subject acid sludges to a steaming operation whereby partial separation of acid was accomplished, whereupon the resulting mass has been burned, for example, as a means of disposal. However, considerable difficulty has been encountered in handling the heavy sticky acidified mass both during and subsequent to the steaming treatment.

In accordance with my invention substantially the entire acid content of sludges of the character aforesaid is removed from the sludge, and the sludge is reduced to a carbonaceous condition which may be satisfactorily used as a fuel. My process comprises decomposing the sludge by passing it, preferably continuously, into a body of hot liquid, the temperature of which, preferably is of the order of from 400° F. to 600° F., whereby the acid content of the sludge is decomposed and given off, in the case of sludge resulting from sulfuric acid treatment, in the form of sulfur dioxide with or without sulfur trioxide. While the hot liquid into which the sludge is introduced is preferably at a temperature of the order above stated, my process may be carried out with the hot liquid at greater or lower temperatures, for example, at temperatures of the order of from 185° F. to 1000° F. Also as a result of introducing the sludge into the hot liquid, the more volatile constituents of the sludge, some of petroleum origin, are vaporized, while that portion of the sludge remaining in the hot liquid is of a coke-like or carbonaceous character.

The body of the liquid into which the sludge is introduced, in accordance with my invention, may be, for example, a petroleum oil, such as gas oil or recycle stock from cracking or fuel oil. It is to be understood, however, that such liquid need not necessarily be a petroleum oil, but may be any of a number of liquids whose boiling ranges and other physical characteristics are such as to permit carrying out my process under the conditions herein specified.

It is to be understood that my process may be carried out under atmospheric, super-atmospheric, or sub-atmospheric pressures.

The coke-like material resulting from passage of the sludge into the hot liquid, and which accumulates in the liquid as a suspended solid, may be removed therefrom, for example, by passage of the mixture into filters or settlers, by means of which the coke-like solids are separated from the liquid. Thereafter the liquid may be passed through a heater and back into the main body of hot liquid, thereby to maintain the body of liquid substantially constant in volume and at the desired temperature. If the liquid is of such character as to permit its use as a fuel, and if it is desired to use the liquid as fuel, the mixture of liquid and coke-like material may be passed directly from the hot bath to fuel burners or to storage, whereupon it may subsequently be used as fuel. In this event, liquid from an outside source, heated to the proper temperature, may be introduced into the hot bath to replace that liquid admixed with the carbonaceous material which has been removed from the system.

As a result of the introduction of the sludge into the hot liquid bath, certain of the volatile components including some of petroleum origin are vaporized. The total gases and vapors formed may be passed from contact with the hot liquid bath, and separated into components by any suitable procedure. Preferably, I remove the more readily condensible hydrocarbon constituents from the mixture by passing the latter through cooling coils, the temperature of which is controlled so that the heavier hydrocarbon constituents will become liquid. The gaseous sulfur dioxide, with or without sulphur trioxide, and uncondensed portions of the volatilized material may then be subjected to further treatment. For example, oxide or oxides of the sulfur may be freed from the other gases and vapors by passing the mixture through an absorption tower in which such other gases and vapors may be dissolved in a body of relatively high boiling oil, or by other suitable and conventional procedure, whereupon the former in their then uncontaminated condition may, for example, be employed in the synthesis of sulfuric acid.

In order that my invention may be more clearly understood, I refer to the accompanying drawing in which the figure illustrates diagrammatically one form of apparatus arrangement in which my process may be carried out.

In the figure, 1 is a line equipped with valve 1a through which the sludge to be treated may be forced by means of pump 2, interposed in such line, into treating chamber or tank 3. This chamber or tank, as illustrated, is covered with suitable insulating material 3a so that radiation of heat therefrom will be prevented to substantial extent.

Liquid to form the body of hot liquid into which the sludge is passed, is introduced into the system through line 4, equipped with valve 4a, which communicates with line 5, provided with suitable pump 6, by means of and through which the liquid is passed into coil 7 of suitable heater 8, provided with a burner 8a or other suitable means for producing heat. Upon being heated to the desired temperature in the coil 7, the liquid passes from the coil through line 9 into the chamber or tank 3.

Line 10 equipped with suitable valve 10a connects lines 1 and 9, so that, if desired, the hot liquid and sludge or a portion thereof may be intermingled prior to their passage into the chamber 3.

In the chamber 3, there is effected volatilization of those components of the sludge which become volatile, or which become decomposed and volatilized at the temperature of the hot liquid within the chamber and under the pressure conditions existing therein. Such components include sulfur dioxide, with which sulfur trioxide may be admixed, in the case of treatment of a sludge formed as a result of sulfuric acid treatment, plus other volatile components of the sludge including some vapors and/or gases of petroleum origin. This volatile mixture is passed from chamber 3 through line 21 into condenser 22 wherein a portion of the mixture, particularly the higher boiling hydrocarbon oil components thereof, is liquefied. From the condenser the mixture passes through line 23 into separator 24, wherein the liquid portion separates from the gaseous portion, the former passing from the separator through line 26 to suitable storage, and the latter passing therefrom through line 25 to an absorption tower or the like (not shown), wherein the sulfur dioxide, plus sulfur trioxide if present, are freed from other volatile components, whereupon they may be employed in the synthesis of sulfuric acid.

The hot liquid in chamber 3, upon accumulating carbonaceous material to a suitable extent, may be withdrawn from the chamber through line 11 either continuously or intermittently, whereupon such liquid with its carbonaceous suspension may either be withdrawn from the system by opening valve 11a with which line 11 is equipped, or may be passed into and through line 12, equipped with suitable valve 12a and tapped into line 11, thence into one or more of the bank of filters or settlers 15 and 16 through lines 13 and 14 equipped with valves 13a and 14a respectively, which communicate with line 12. Parts 15 and/or 16 may be any of a number of different conventional types, such as continuous rotary filters, press and frame filters, continuous settlers, etc. In the filters or settlers 15 and 16, the solid carbonaceous material is removed from the liquid and may be passed from the system through outlets 19 and 20. The liquid after passage through the filters or settlers may be conducted through lines 17 and 18, equipped with valves 17a and 18a respectively, which connect with line 5, equipped with valve 5a, which latter line communicates with the coil 7 of heater 8.

The description of apparatus hereinabove given is for the purpose of illustration and not with any intention of limiting the scope of my invention either with respect to process or apparatus.

From the above description, taken in connection with accompanying drawing, it will be seen that my invention provides for several modes of procedure. For example, if desired, the hot liquid used in chamber 3 may be recirculated for a prolonged period of time without withdrawal of the liquid from the system, or part of the hot liquid may be withdrawn from the system and the remainder recycled, whereupon make-up liquid may be delivered to the system through line 4 to compensate for the portion removed, or liquid may be continuously introduced into the system through line 4 and continuously withdrawn from the system through line 11, in which event none of the liquid would be recirculated. It will be seen that sludge and the hot liquid may be introduced into the chamber 3 either separately or together, or a part of the sludge may be introduced separately and the remainder introduced into the chamber in admixture with the hot liquid.

The temperatures of decomposition of acid sludges vary considerably depending upon the nature of each particular sludge. For example, a sludge produced by the sulfuric acid treatment of a petroleum fraction of the kerosene boiling range will, in general, decompose at a lower temperature than if the sludge had been formed as a result of sulfuric acid treatment of an oil of lubricating boiling range. Therefore, when, in the appended claims, the liquid into which the sludge is passed is defined as a "heated liquid", it is to be understood that such liquid is at a sufficiently high temperature to effect at least some substantial decomposition of the sludge into volatile and coky components.

In carrying out my process, in some instances it may be desirable to preheat the sludge prior to its introduction into the hot body of liquid. This may be accomplished, for example, by passing the sludge into indirect contact with the hot vapors and gases emitted from the hot body of liquid, in a suitable heat exchanger. Further, it may be found desirable continuously or intermittently to withdraw from the system portions of the hot body of liquid along with carbonaceous material suspended therein resulting from the coking of the sludge, and thereafter remove the carbonaceous material from the liquid by any suitable means, such as by filtering, without subsequently returning the liquid to the system. For example, such procedure may be followed when the acid sludge contains an appreciable quantity of free acid and the hot liquid into which the sludge is introduced is a petroleum fraction which it is desired to refine by acid treatment. The carbonaceous material so removed may be used as a fuel, for example, and the liquid freed therefrom may be put to other desired use. Further, rather than circulate the liquid from the main body thereof, through a heater and back into the main liquid body, suitable heating means may be provided around or adjacent to the chamber containing such body of liquid, to maintain the liquid at the desired temperature of operation, in which instance, liquid, for example, may be continuously or intermittently introduced into the body either unheated, or preheated, for example, by previous passage into indirect heat exchange relation with the vapors and gases emitted from the hot body of liquid. Any of the modifications as above set forth or the like, and others which may occur to one skilled in the art upon reading what has been set forth hereinabove, are considered within the scope of my invention.

When, in the appended claims, the terms "substantially non-aqueous" or "substantially free from aqueous constituents" are employed in describing the body of liquid into which the sludge is passed, it is to be understood that such terms mean that water and/or steam, or equivalent, is not present in the liquid to an extent which will cause appreciable or substantial hydrolysis of components of the sludge which are susceptible of hydrolysis.

It will be noted that in all of its various modifications, my process is characterized in that the sludge is substantially completely decomposed. In the prior steam treating processes the acid components, such as sulfonic acids, are largely hydrolized to give sulfuric acid and hydrocarbons or hydrocarbon derivatives, including tarry materials. In my process, on the other hand, the conditions are such that the acid part of the sludge is substantially completely reduced, giving principally sulfur dioxide, and at the same time the tarry compounds are decomposed to form coke. The principal products of my process are therefore coke, hydrocarbon oil, sulfur dioxide and water.

What I claim is:

1. A process for decomposing sludge which comprises passing a stream of the sludge continuously into a body of hot liquid maintained at a temperature sufficiently high to cause coking of the sludge to substantial extent, continuously withdrawing from the body of hot liquid portions thereof in which coky portions of the sludge are suspended, continuously passing vapors and gases formed as a result of contact of the sludge with the hot body of liquid, from contact with such body of liquid, and continuously passing liquid into said body of liquid to maintain its volume substantially constant.

2. The process of decomposing sludge which comprises passing sludge into a body of heated liquid maintained at a temperature sufficiently high to cause coking of a portion of the sludge and volatilization of another portion thereof, withdrawing from said body of heated liquid a portion thereof in which there is suspended coky material resulting from decomposition of sludge, separating from such portion the coky material, heating the liquid freed from coky material to a temperature in excess of that at which the hot body of liquid is to be maintained, and passing the heated liquid back into the hot body of liquid, thereby to maintain the volume and temperature of said body of liquid substantially constant.

3. Apparatus for decomposing sludge which comprises, a chamber adapted to hold a body of hot liquid, a pipe associated with said chamber for introducing sludge thereinto, a conduit communicating with said chamber for passing vapors out of the chamber, means associated with said chamber for withdrawing from the body of hot liquid a portion thereof, means connecting with said last mentioned means for removing solids from the portion of hot liuqid withdrawn, and heating means connecting with the removing means and with the chamber whereby liquid after having been freed from solids may be heated and reintroduced into the chamber.

4. In a process for the recovery of components from sludge, the step which comprises passing the sludge into a body of liquid at a temperature sufficiently high to cause decomposition and coking of at least a portion of the sludge, said body of liquid being stable at the temperature to which same has been raised, and being miscible with mineral oil released as a result of decomposition of the sludge.

5. In a process for decomposing sludge, the step which comprises passing the sludge into a body of mineral oil at a temperature sufficiently high to cause decomposition and coking of at least a portion of the sludge.

6. In a process for decomposing acid sludge, the step which comprises passing the sludge into a body of mineral oil at a temperature sufficiently high to cause coking of at least a portion of the sludge, said mineral oil being substantially non-reactive with components of the sludge other than its free mineral acid components.

7. In a process for decomposing acid sludge, the step which comprises passing the sludge into a body of liquid substantially free from water at a temperature sufficiently high to cause coking of at least a portion of the sludge, said liquid being substantially stable at the temperature employed, being miscible with mineral oil released as a result of decomposition of the sludge, and of sufficiently high boiling point so that no substantial amount thereof will vaporize at the temperature employed.

8. In a process for decomposing sludge, the steps which comprise bringing the sludge into contact with a body of mineral oil, during at least a portion of the time that the sludge is in contact therewith, maintaining the body of oil at a temperature sufficiently high to cause decomposition and coking of at least a portion of the sludge, said mineral oil being of sufficiently high boiling point so that no substantial amount thereof will vaporize at the temperature employed.

9. In a process for decomposing sludge resulting from the treatment of petroleum oil with sulfuric acid, the steps which comprise passing the sludge into a body of mineral oil substantially free from water, maintained at a temperature of the order of from 400° F. to 600° F., whereby the sludge is substantially completely converted into friable coky substances, hydrocarbon oil oxides of sulfur and water.

LLOYD B. SMITH.